(12) United States Patent
Wu et al.

(10) Patent No.: US 11,346,306 B1
(45) Date of Patent: May 31, 2022

(54) CHEMICAL AND COLD GAS PROPELLANT SYSTEMS AND METHODS

(71) Applicant: Ball Aerospace & Technologies Corp., Boulder, CO (US)

(72) Inventors: Gordon C. Wu, Lafayette, CO (US); Suzan Q. Green, Longmont, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 0 days.

(21) Appl. No.: 16/733,518

(22) Filed: Jan. 3, 2020

Related U.S. Application Data

(60) Provisional application No. 62/787,976, filed on Jan. 3, 2019.

(51) Int. Cl.
  *F02K 9/50* (2006.01)
  *B64G 1/26* (2006.01)
  (Continued)

(52) U.S. Cl.
  CPC ............... *F02K 9/50* (2013.01); *B64G 1/244* (2019.05); *B64G 1/26* (2013.01); *B64G 1/402* (2013.01);
  (Continued)

(58) Field of Classification Search
  CPC .......... B64G 1/244; B64G 1/26; B64G 1/402; F02K 9/44; F02K 9/50; F02K 9/566; F02K 9/88
  See application file for complete search history.

(56) References Cited

U.S. PATENT DOCUMENTS 3,350,886 A * 11/1967 Feraud .................. F02K 9/82
                                                          60/204
4,609,169 A    9/1986 Schweickert et al.
                        (Continued)

FOREIGN PATENT DOCUMENTS

EP     2530018     7/2014
EP     3689758     3/2021

OTHER PUBLICATIONS

Wikipedia, Control Valves, Nov. 18, 2009, Wikipedia (Year: 2009).*
(Continued)

*Primary Examiner* — Todd E Manahan
*Assistant Examiner* — Kyle Robert Thomas
(74) *Attorney, Agent, or Firm* — Sheridan Ross P.C.

(57) ABSTRACT

Integrated chemical propellant and cold gas propulsion systems and methods are provided. A storage or fuel tank containing the chemical propellant is pressurized by a pressurant. The chemical propellant is selective passed to a propellant thruster through a first port of the storage tank and a propellant valve. The pressurant is selectively passed to a cold gas thruster through a second port of the storage tank and a cold gas valve. In addition, a pressurant tank can be provided. Pressurant contained within the pressurant tank can be selectively placed in communication with the pressurant contained within the storage tank via a pressurant valve, or can be selectively passed to the cold gas thruster through the cold gas thruster valve. Systems can also include bi-propellant thrusters, with a first and second chemical compounds and volumes of pressurant stored in first and second storage tanks respectively.

22 Claims, 7 Drawing Sheets

(51) Int. Cl.
*B64G 1/40* (2006.01)
*F02K 9/56* (2006.01)
*F02K 9/88* (2006.01)
*B64G 1/24* (2006.01)
*F02K 9/44* (2006.01)

(52) U.S. Cl.
CPC .............. *F02K 9/44* (2013.01); *F02K 9/566* (2013.01); *F02K 9/88* (2013.01)

(56) References Cited

U.S. PATENT DOCUMENTS

| | | | |
|---|---|---|---|
| 4,880,185 | A | 11/1989 | Apfel |
| 5,026,259 | A | 6/1991 | Whitehead et al. |
| 5,823,478 | A * | 10/1998 | Dunn ............... B64G 1/402 244/171.1 |
| 5,927,653 | A * | 7/1999 | Mueller .............. B64G 1/62 244/171.3 |
| 5,961,074 | A * | 10/1999 | Dunn .................. F02K 9/50 244/135 R |
| 6,119,985 | A | 9/2000 | Clapp et al. |
| 6,299,107 | B1 | 10/2001 | Kong et al. |
| 6,457,306 | B1 | 10/2002 | Abel et al. |
| 6,971,228 | B2 | 12/2005 | Dujarric |
| 7,762,498 | B1 | 7/2010 | Henderson et al. |
| 8,074,935 | B2 | 12/2011 | Gryniewski et al. |
| 8,181,911 | B1 | 5/2012 | Gryniewski et al. |
| 8,393,582 | B1 | 3/2013 | Kutter et al. |
| 8,899,527 | B2 | 12/2014 | Allen et al. |
| 9,108,747 | B2 | 8/2015 | Roberts et al. |
| 9,145,216 | B2 | 9/2015 | Gascon et al. |
| 9,249,758 | B2 | 2/2016 | Conrardy |
| 9,260,206 | B2 | 2/2016 | Allen et al. |
| 9,446,862 | B2 * | 9/2016 | Barthoulot ............ B64G 1/402 |
| 9,567,111 | B2 | 2/2017 | Roberts et al. |
| 9,676,499 | B2 | 6/2017 | Myers et al. |
| 9,688,422 | B2 | 6/2017 | Roberts et al. |
| 10,589,879 | B2 | 3/2020 | Baldwin et al. |
| 10,604,281 | B2 | 3/2020 | Raven et al. |
| 10,738,739 | B2 | 8/2020 | Bahn |
| 10,844,808 | B2 | 11/2020 | Bahn et al. |
| 10,926,892 | B1 | 2/2021 | Wu et al. |
| 10,926,982 | B2 | 2/2021 | Lindberg |
| 11,021,273 | B1 | 6/2021 | Wu et al. |
| 11,059,608 | B2 | 7/2021 | Holder et al. |
| 2002/0139902 | A1 * | 10/2002 | Valentian ............ B64G 1/401 244/171.1 |
| 2002/0179776 | A1 | 12/2002 | Mueller et al. |
| 2003/0075645 | A1 | 4/2003 | Randolph et al. |
| 2003/0131583 | A1 | 7/2003 | Kudija, Jr. et al. |
| 2003/0173469 | A1 | 9/2003 | Kudija, Jr. et al. |
| 2003/0209005 | A1 | 11/2003 | Fenn |
| 2004/0031885 | A1 | 2/2004 | D'Ausilio et al. |
| 2004/0035982 | A1 | 2/2004 | Capozzi et al. |
| 2004/0061028 | A1 | 4/2004 | Salvatore et al. |
| 2004/0226279 | A1 | 11/2004 | Fenn |
| 2004/0245406 | A1 | 12/2004 | Guiheen et al. |
| 2004/0245407 | A1 | 12/2004 | D'Ausilio et al. |
| 2005/0034447 | A1 | 2/2005 | Joshi et al. |
| 2005/0151022 | A1 | 7/2005 | D'Ausilio et al. |
| 2005/0205717 | A1 | 9/2005 | Salvatore et al. |
| 2007/0040067 | A1 | 2/2007 | D'Ausilio et al. |
| 2007/0108349 | A1 | 5/2007 | D'Ausilio et al. |
| 2007/0114334 | A1 | 5/2007 | D'Ausilio et al. |
| 2007/0153960 | A1 | 7/2007 | D'Ausilio et al. |
| 2007/0153961 | A1 | 7/2007 | D'Ausilio et al. |
| 2007/0153962 | A1 | 7/2007 | D'Ausilio et al. |
| 2008/0011903 | A1 | 1/2008 | D'Ausilio et al. |
| 2008/0027595 | A1 | 1/2008 | Fowler et al. |
| 2008/0029651 | A1 | 2/2008 | D'Ausilio et al. |
| 2008/0142639 | A1 | 6/2008 | Jallade |
| 2008/0256924 | A1 | 10/2008 | Pederson et al. |
| 2008/0296436 | A1 | 12/2008 | D'Ausilio et al. |
| 2009/0020650 | A1 | 1/2009 | Ho |
| 2009/0078829 | A1 | 3/2009 | Ho et al. |
| 2009/0242704 | A1 | 10/2009 | D'Ausilio et al. |
| 2009/0299553 | A1 | 12/2009 | Hope |
| 2009/0313967 | A1 | 12/2009 | Joshi et al. |
| 2009/0320974 | A1 | 12/2009 | Joshi et al. |
| 2010/0180443 | A1 | 7/2010 | Joshi et al. |
| 2011/0144835 | A1 | 6/2011 | Ho |
| 2011/0180670 | A1 | 7/2011 | D'Ausilio et al. |
| 2012/0241355 | A1 | 9/2012 | Tuttle et al. |
| 2012/0241459 | A1 | 9/2012 | Tuttle |
| 2012/0325972 | A1 | 12/2012 | Gryniewski et al. |
| 2013/0313370 | A1 | 11/2013 | Rakers |
| 2014/0032092 | A1 | 1/2014 | Vu |
| 2014/0365043 | A1 | 12/2014 | Vu |
| 2015/0021439 | A1 | 1/2015 | Duchemin et al. |
| 2016/0200457 | A1 | 7/2016 | Droppers |
| 2016/0273524 | A1 | 9/2016 | Keidar et al. |
| 2016/0333826 | A1 * | 11/2016 | Tsay ................. F02K 9/605 |
| 2016/0368624 | A1 | 12/2016 | Hruby et al. |
| 2017/0283095 | A1 | 10/2017 | Koehler et al. |
| 2017/0284339 | A1 | 10/2017 | Koehler et al. |
| 2017/0361951 | A1 | 12/2017 | Walker |
| 2017/0363044 | A1 | 12/2017 | Rhodes |
| 2017/0370353 | A1 | 12/2017 | Keidar et al. |
| 2018/0148197 | A1 | 5/2018 | Halsband et al. |
| 2018/0186476 | A1 | 7/2018 | Poncet et al. |
| 2018/0327118 | A1 | 11/2018 | Ganapathy et al. |
| 2018/0370659 | A1 | 12/2018 | Keidar et al. |
| 2019/0077523 | A1 | 3/2019 | Faber |
| 2019/0144140 | A1 | 5/2019 | Hosoda et al. |
| 2019/0168606 | A1 | 6/2019 | Faber et al. |
| 2020/0003159 | A1 | 1/2020 | Karp et al. |
| 2020/0024003 | A1 | 1/2020 | Koehler et al. |
| 2020/0283174 | A1 | 9/2020 | Kokorich et al. |
| 2020/0407084 | A1 | 12/2020 | Shashurin et al. |

OTHER PUBLICATIONS

Chato "Technologies for Refueling Spacecraft On-Orbit," NASA, Nov. 2000, NASA/TM-2000-210476, 14 pages.

* cited by examiner

PRIOR ART

CHEMICAL AND COLD GAS PROPELLANT SYSTEMS AND METHODS

CROSS-REFERENCE TO RELATED APPLICATIONS

This application claims the benefit of U.S. Provisional Patent Application Ser. No. 62/787,976, filed Jan. 3, 2019, the entire disclosure of which is hereby incorporated herein by reference.

FIELD

This disclosure is directed to systems and methods that integrate chemical and cold gas propellant systems for spacecraft.

BACKGROUND

Spacecraft and satellites (hereinafter referred to collectively as spacecraft) often incorporate thrusters for propulsion and attitude control. Thrusters can include chemical propulsion systems that operate by combusting a chemical propellant in a combustion chamber to produce an exhaust gas that is ejected through a nozzle, thereby creating thrust in a desired direction. Thrusters can also include cold gas thruster systems, which eject pressurized gas through a nozzle.

Chemical propellant type thrusters can produce high levels of thrust, but often require heater systems to maintain the propellant in a desired temperature range. Cold gas thrusters typically produce lower levels of thrust, but do not require heating. In some spacecraft, separate chemical propellant and cold gas type thruster systems are included. Such spacecraft thus can benefit from the high thrust of a chemical propellant based thruster system early in the mission, while ensuring a continued ability to maneuver or perform attitude adjustments after the chemical propellant has been depleted or after it is no longer possible to maintain the chemical propellant within the required temperature range using a cold gas thruster system. However, the inclusion of multiple, separate thruster systems adds volume, mass, complexity, and cost to the spacecraft.

SUMMARY

Embodiments of the present disclosure are directed to propulsion systems and methods that include integrated chemical propellant thrusters and cold gas thrusters. More particularly, a propulsion system in accordance with embodiments of the present disclosure includes a combined chemical propellant and pressurant management system that requires reduced volume, mass, and complexity, and that can be provided at reduced cost as compared to previous systems. The pressurant is applied to maintain a desired pressure within a storage tank containing the chemical propellant. The chemical propellant can be selectively passed to a chemical propellant thruster by a valve, thus forming a chemical propellant type thruster system. In addition, the pressurant can be selectively passed to a cold gas thruster via a valve and a pressure regulator, thus forming a cold gas thruster system.

Systems in accordance with embodiments of the present disclosure include storage for a chemical propellant and storage for a pressurant. The chemical propellant can be of a single type for a monopropellant thruster system, or different chemical propellant compounds can be stored in different storage tanks for a bi-propellant thruster system. In accordance with at least some embodiments of the present disclosure, the pressurant is stored in the same storage tank or tanks as the chemical propellant. In accordance with further embodiments of the present disclosure, a storage tank that is separate from the storage tank or tanks containing the chemical propellant or propellants is provided for storing pressurant. Valves are provided to selectively connect a storage tank or tanks to propellant or cold gas thrusters.

Where one or more shared storage tanks are used to store chemical propellant and pressurant, a valve in communication with chemical propellant in the storage tank selectively provides the propellant to a chemical propellant thruster, and a valve in communication with pressurant in the storage tank selectively provides the pressurant to a cold gas thruster. Where a storage tank for storing pressurant is provided in addition to a shared storage tank or tanks for storing chemical propellant and pressurant, valves can be operated to place the pressurant tank in communication with a shared storage tank to pressurize chemical propellant in the shared storage tank, or to supply pressurant from the pressurant tank to a cold gas thruster.

Methods in accordance with embodiments of the present disclosure include storing a chemical propellant in a storage tank, and pressurizing the chemical propellant with a pressurant. In bi-propellant thruster systems, different chemical components are stored in different storage tanks and pressurized by a pressurant. In accordance with at least some embodiments, pressurant is also stored in a storage tank that does not contain any chemical propellant. In a chemical propellant thrust mode, a valve or valves selectively connecting a storage tank or tanks containing the chemical propellant or propellants are operated to supply the chemical propellant to a propellant thruster for combustion and the generation of thrust. In a cold gas thrust mode, a valve selectively connecting a storage tank containing pressurant is operated to supply the pressurant to a cold gas thruster for expansion and the generation of thrust.

Additional features and advantages of embodiments of the disclosed systems and methods will become more readily apparent from the following description, particularly when taken together with the accompanying drawings.

DETAILED DESCRIPTION

Figure 1:
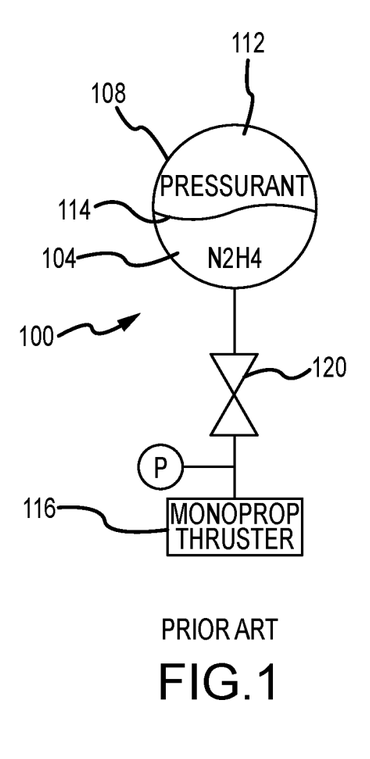
FIG. 1 is a block diagram depicting a prior art monopropellant thruster system.
Figure 2:
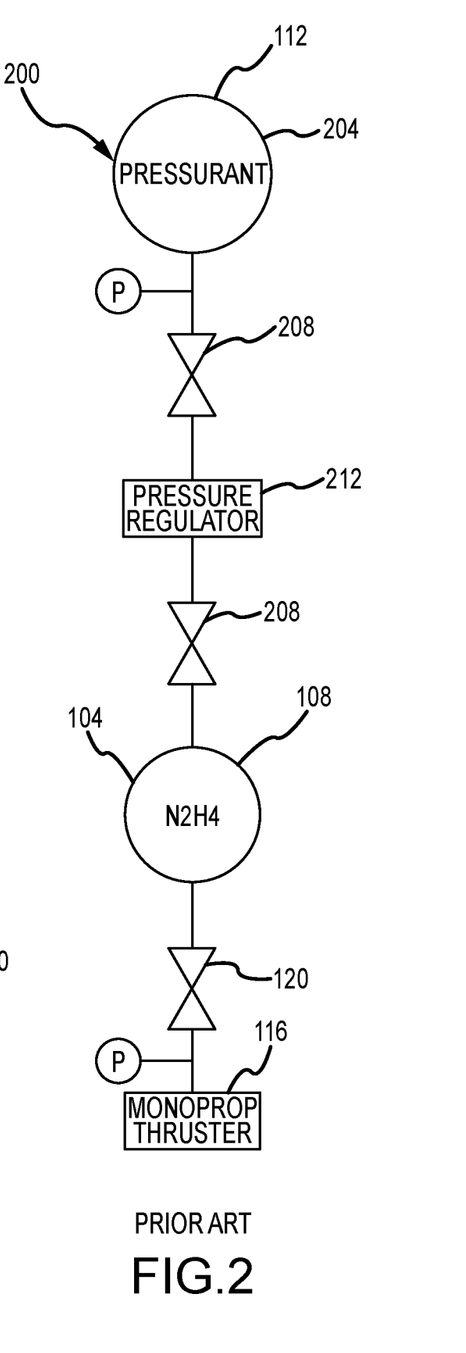
FIG. 2 is a block diagram depicting another prior art monopropellant thruster system.

Examples of prior art monopropellant systems 100 and 200 are illustrated in FIGS. 1 and 2 respectively. In these example systems 100, the chemical propellant 104 is hydrazine contained within a storage or fuel tank 108. Under normal operating conditions, the chemical propellant 104 is stored as a liquid. The chemical propellant 104 is pressurized by a pressurant 112. Under normal operating conditions, the pressurant is a gas. In the system 100 shown in FIG. 1, the pressurant 112 is stored with the chemical propellant 104 in the storage tank 108. The pressurant 112 may be physically separated from the chemical propellant 104 by a diaphragm 114. In the system 200 shown in FIG. 2, the pressurant 112 is stored in a pressurant tank 204 that is connected to the storage tank 108 via pressurant valves 208 and a pressure regulator 212. As illustrated in FIG. 2, the pressurant 112 can be in direct contact with the chemical propellant 104 in the storage tank 108. In either system 100, 200, the chemical propellant 104 is selectively passed to a monopropellant (or monoprop) thruster 116 via a propellant valve 120 for combustion and the generation of thrust.

Figure 3:
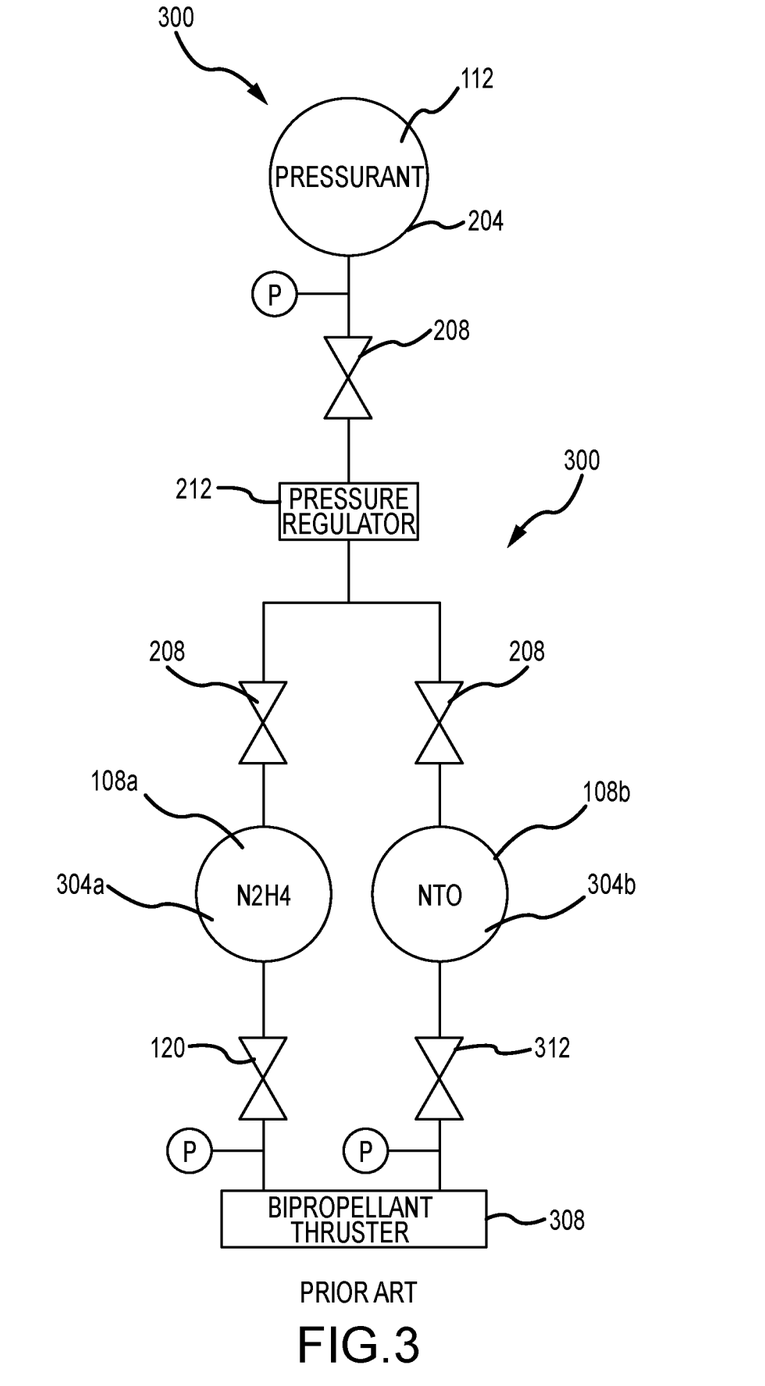
FIG. 3 is a block diagram depicting a prior art bi-propellant thruster system.

FIG. 3 depicts a prior art bi-propellant system 300 having first and second storage tanks 108a and 108b. In this example, a first chemical propellant component 304a, here a volatile chemical component such as monomethylhydrazine (MMH) or hydrazine (N2H4), is stored in the first storage or propellant tank 108a, and a second chemical propellant component 304b, here an oxidizer such as nitrogen tetroxide (NTO), is stored in the second storage or oxidizer tank 108b. A pressurant 112 is stored in a third storage or pressurant tank 204 that is connected to the storage tanks 108a and 108b via pressurant valves 208 and a pressure regulator 212. The chemical compounds 304a and 304b are selectively passed to a bipropellant thruster 308 via propellant 120 and oxidizer 312 valves respectively for reaction (ignition) and the generation of thrust. Alternatively or in addition, the pressurant 112 can be stored directly in the storage tanks 108a and 108b. In either type of chemical propellant type thruster system, combustion of the propellant in the bipropellant thruster 308 creates a gas that is released from the thruster 308 to generate thrust in a selected direction.

Figure 4:
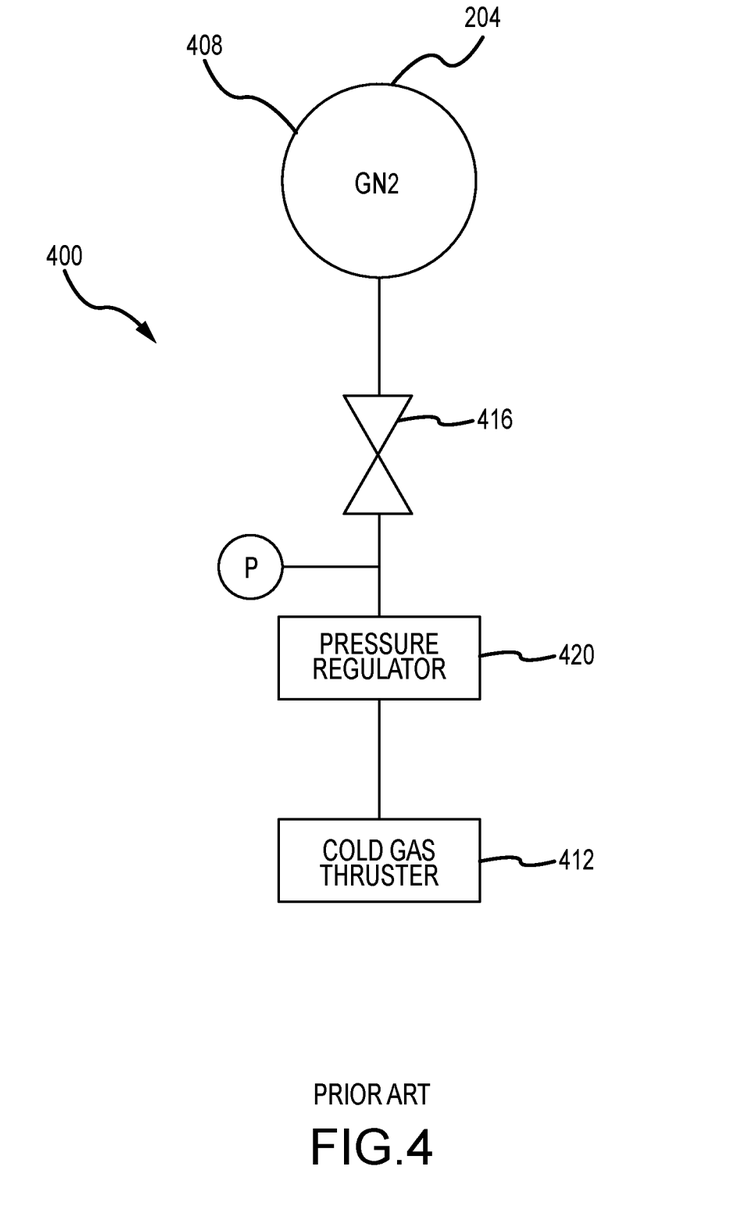
FIG. 4 is a block diagram depicting a prior art cold gas thruster system.

A prior art cold gas thruster system 400 is depicted in FIG. 4. The cold gas thruster system 400 includes a pressure vessel 204 containing an inert gas 408, such as gaseous helium or gaseous nitrogen, as a propellant. The volume of gas 408 is selectively connected to a cold gas thruster 412 via a cold gas valve 416 and a pressure regulator 420. Thrust is generated through expansion and release of the pressurized gas 408 in the cold gas thruster 412.

Figure 5:
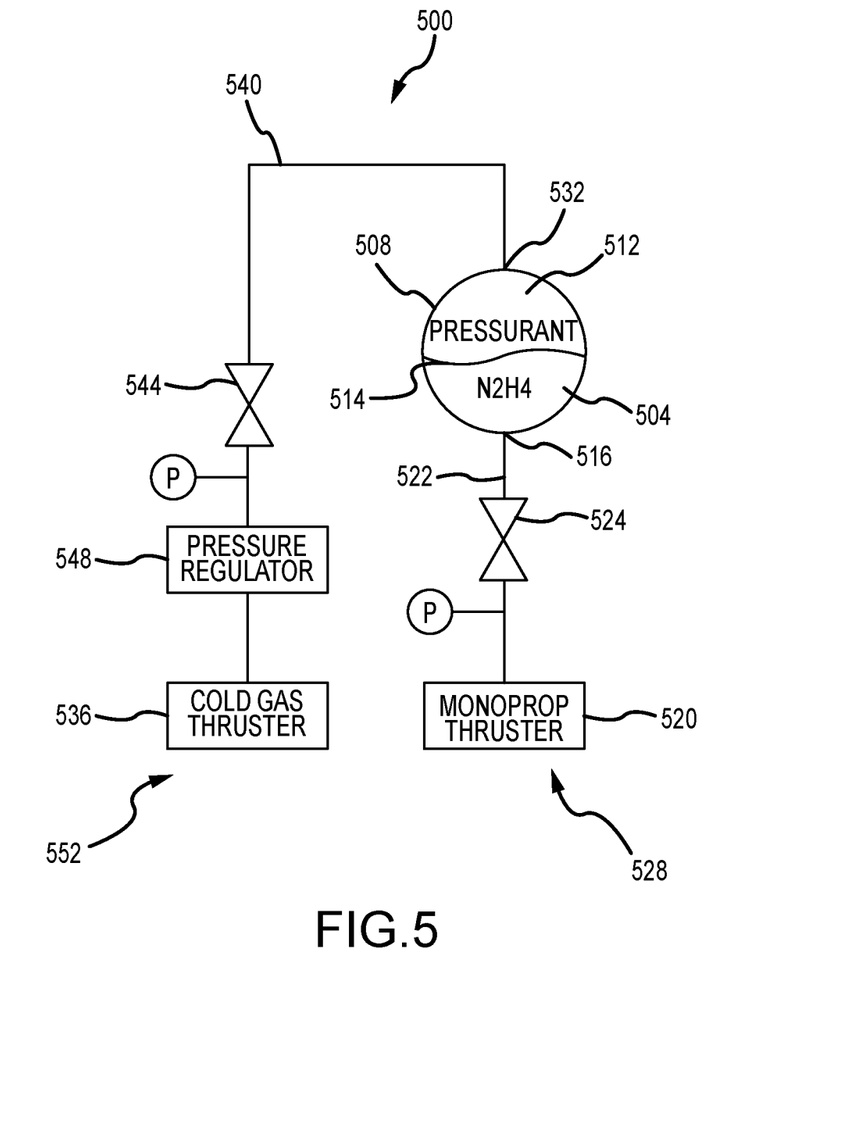
FIG. 5 is a block diagram depicting an integrated chemical propellant and cold gas thruster system in accordance with embodiments of the present disclosure.

With reference now to FIG. 5, an integrated chemical and cold gas propellant thruster system 500 in accordance with embodiments of the present disclosure is depicted. In this embodiment, the chemical propellant portion of the system utilizes a single chemical propellant or monopropellant 504 stored in a storage tank 508 that also contains a pressurant 512. The storage tank 508 can be divided into a first chamber containing the chemical propellant 504 and a second chamber containing the pressurant 512 by a diaphragm 514. The diaphragm 514 can be a flexible (e.g. rubber) diaphragm, a rolling metal diaphragm, or some other barrier that allows a compound on one side of the diaphragm 514 to exert pressure against a compound on the opposite side of the diaphragm 514, while maintaining a physical separation between the monopropellant 504 and the pressurant 512. Alternatively, the first storage tank 508 can be a propellent management device (PMD) type tank, in which structures in an interior of the tank are provided to enable propellant 504 to be delivered through a port 516 to the thruster 520, but without requiring a barrier between the chemical propellant 504 and the pressurant 512. As an example, but without limitation, the monopropellant 504 can be hydrazine, and the pressurant 512 can be an inert gas.

The monopropellant 504 is selectively passed through a first port 516 of the storage tank 508 to a monopropellant thruster 520 via a conduit 522 and a propellant valve 524, thereby forming a chemical thruster system 528. Thrust is produced at the monopropellant thruster 520 by decomposing the chemical propellant 504 in the monopropellant thruster 520, and directing the resulting gas out of the monopropellant thruster 520 through a nozzle. The pressurant 512 is selectively passed through second port 532 of the storage tank 508 to a cold gas thruster 536 via a conduit 540, a cold gas valve 544, and a pressure regulator 548, thereby forming a cold gas thruster system 552. Thrust is produced at the cold gas thruster 536 by directing the pressurant 512 out of the cold gas thruster 536 through a nozzle. Accordingly, the integrated chemical and cold gas propellant thruster system 500 uses a single storage tank 508 to provide both a chemical thruster system 528 and a cold gas thruster system 552. Moreover, the pressurant 512 stored in the storage tank 508 can be applied as cold gas propellant, in addition to being applied as a mechanism for pressurizing the chemical propellant 504.

Figure 6:
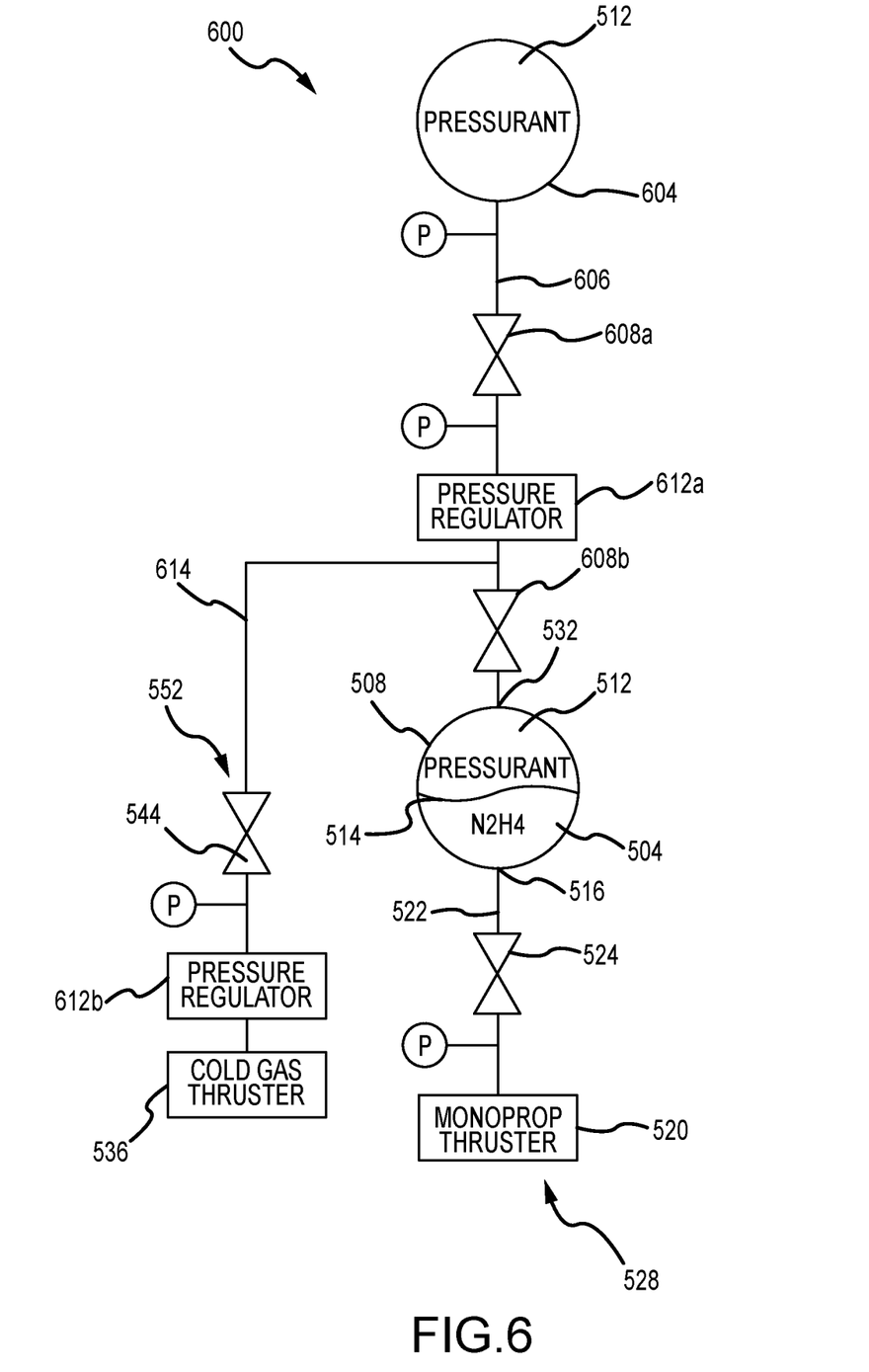
FIG. 6 is a block diagram depicting an integrated chemical propellant and cold gas thruster system in accordance with other embodiments of the present disclosure.

An integrated chemical and cold gas propellant thruster system 600 in accordance with other embodiments of the present disclosure is depicted in FIG. 6. In this system 600, the chemical propellant 504 is a monopropellant stored in a first storage tank 508 that also contains a first amount or volume of a pressurant 512. The chemical propellant 504 can be physically separated from the pressurant 512 by a diaphragm 514, or a PMD type storage tank 508 can be used. Also in this example embodiment, a second amount or volume of the pressurant 512 is maintained in a second storage tank or pressurant tank 604. The pressurant 512 in the second storage tank 604 is selectively connected to a second port 532 of the storage tank 508 via a conduit 606, first 608a and second 608b pressurant valves, and a first pressure regulator 612a. Accordingly, pressurant 512 from the second storage tank 604 can be delivered to the first storage tank 508, for example to maintain a desired pressure level in the first storage tank 508 as chemical propellant 504 is drawn from the first storage tank 504.

In operation to produce thrust, the monopropellant 504 can be selectively passed through a first port 516 of the storage tank 508 to a monopropellant thruster 520 via a conduit 522, and a propellant valve 524, thereby forming a chemical thruster system 528. In addition, the pressurant 512 can be selectively passed from the pressurant tank 604 to a cold gas thruster 536 via the conduit 606, the first pressurant valve 608a, a first pressure regulator 612a, a conduit 614, a cold gas valve 544, and a second pressure regulator 612b. Moreover, pressurant 512 contained within the storage tank 508 can be selectively passed to the cold gas thruster 536 from the second port 532 of the storage tank 508 via the second pressurant valve 608b, the conduit 614, the cold gas valve 544, and the second pressure regulator 612b.

Figure 7:
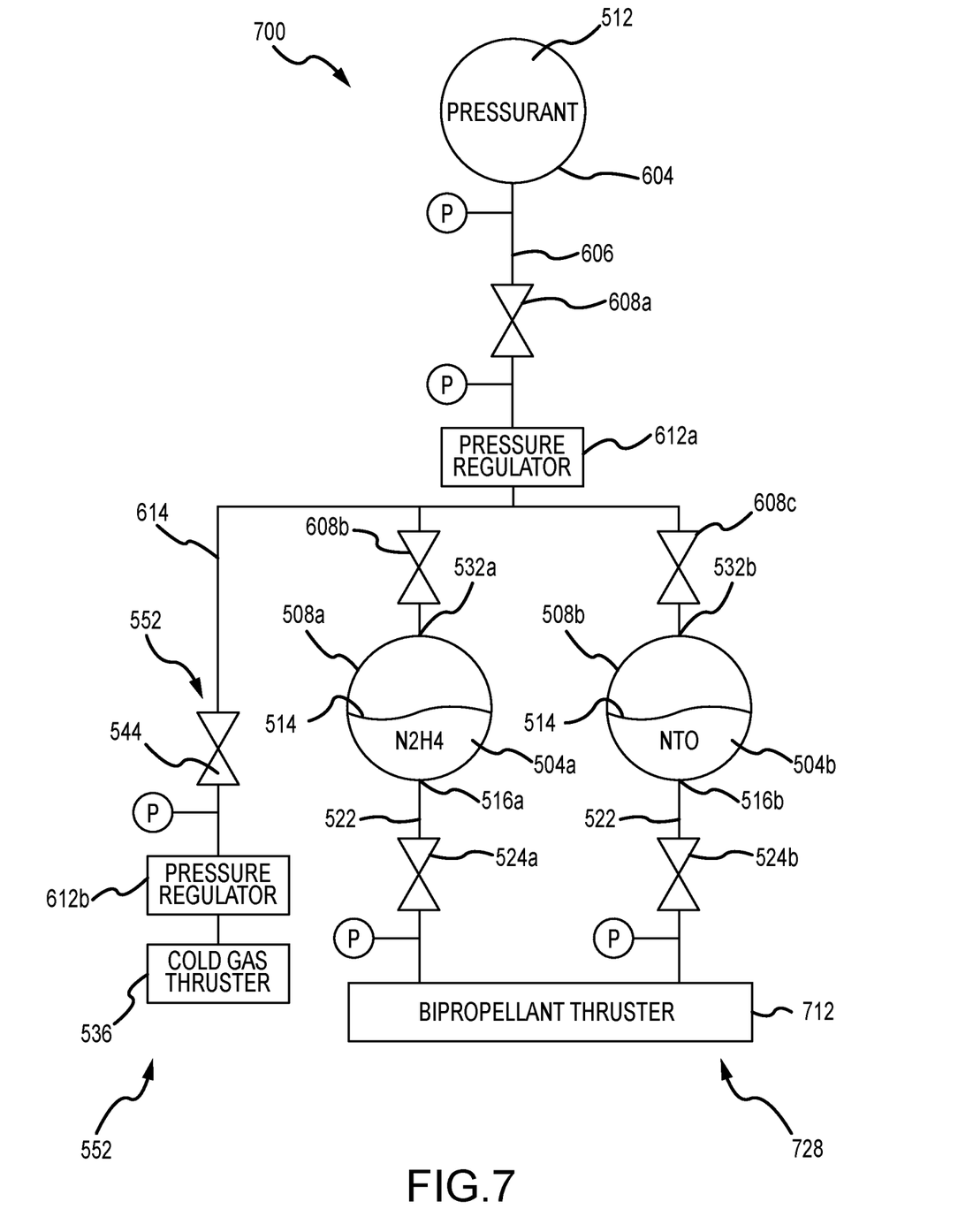
FIG. 7 is a block diagram depicting an integrated chemical propellant and cold gas thruster system in accordance with still other embodiments of the present disclosure.

An integrated chemical and cold gas propellant thruster system 700 in accordance with still other embodiments of the present disclosure is depicted in FIG. 7. In this system 700, a bipropellant chemical thruster system 728, incorporating a first chemical propellant component or fuel propellant 504a, such as MMH or N2H4, stored in a first storage tank 508a and a second chemical propellant component or oxidizer component 504b, such as NTO, stored in a second storage tank 508b, are provided. A volume of a pressurant 512 is stored in a third storage tank or pressurant tank 604. In addition, a volume of the pressurant 512 can be maintained in the first storage tank 508a, and similarly, a volume of the pressurant 512 can be maintained in the second storage tank 508b. A diaphragm 514 can be included in one or both of the first and second storage tanks 508a and 508b to physically separate the respective chemical propellant components 504a and 504b from the pressurant 512, or one or both of the storage tanks 508a and 508b can be implemented as PMD type tanks. For example, where the tank 508b contains NTO, which is incompatible with many diaphragm 514 materials, a PMD type tank may be used. The pressurant 512 contained in the third storage tank 604 is selectively connected to a second port 532a of the first storage tank 508a by a conduit 606, a first pressurant valve 608a, a first pressure regulator 612a, and a second pressurant valve 608b. The pressurant 512 contained in the third storage tank 604 is selectively connected to a second port 532b of the second storage tank 508b by the conduit 606, the first pressurant valve 608a, the first pressure regulator 612a, and a third pressurant valve 608c. The fuel propellant 504a and the oxidizer propellant 504b can be selectively passed through the first outlets 516a and 516b of the respective storage tanks 508a and 508b to a bipropellant thruster 712 via valves 524a and 524b for the generation of thrust through the reaction of the chemical propellant components 504a and 504b.

In addition, pressurant 512 can be selectively passed from the pressurant tank 604 to the cold gas thruster 536 via the conduit 606, the first pressurant valve 608a, the first pressure regulator 612a, a conduit 614, a cold gas valve 544, and a second pressure regulator 612b. In accordance with the least some embodiments of the present disclosure, pressurant 512 contained within the first storage tank 508a can be selectively passed to the cold gas thruster 536 via the second port 532a, the second pressurant valve 608b, the conduit 614, the cold gas valve 544, and the second pressure regulator 612b, and pressurant 512 contained within the second storage tank 508b can be selectively passed to the cold gas thruster 536 via the second port 532b, the third pressurant valve 608c, the conduit 614, the cold gas valve 544, and the second pressure regulator 612b.

Figure 8:
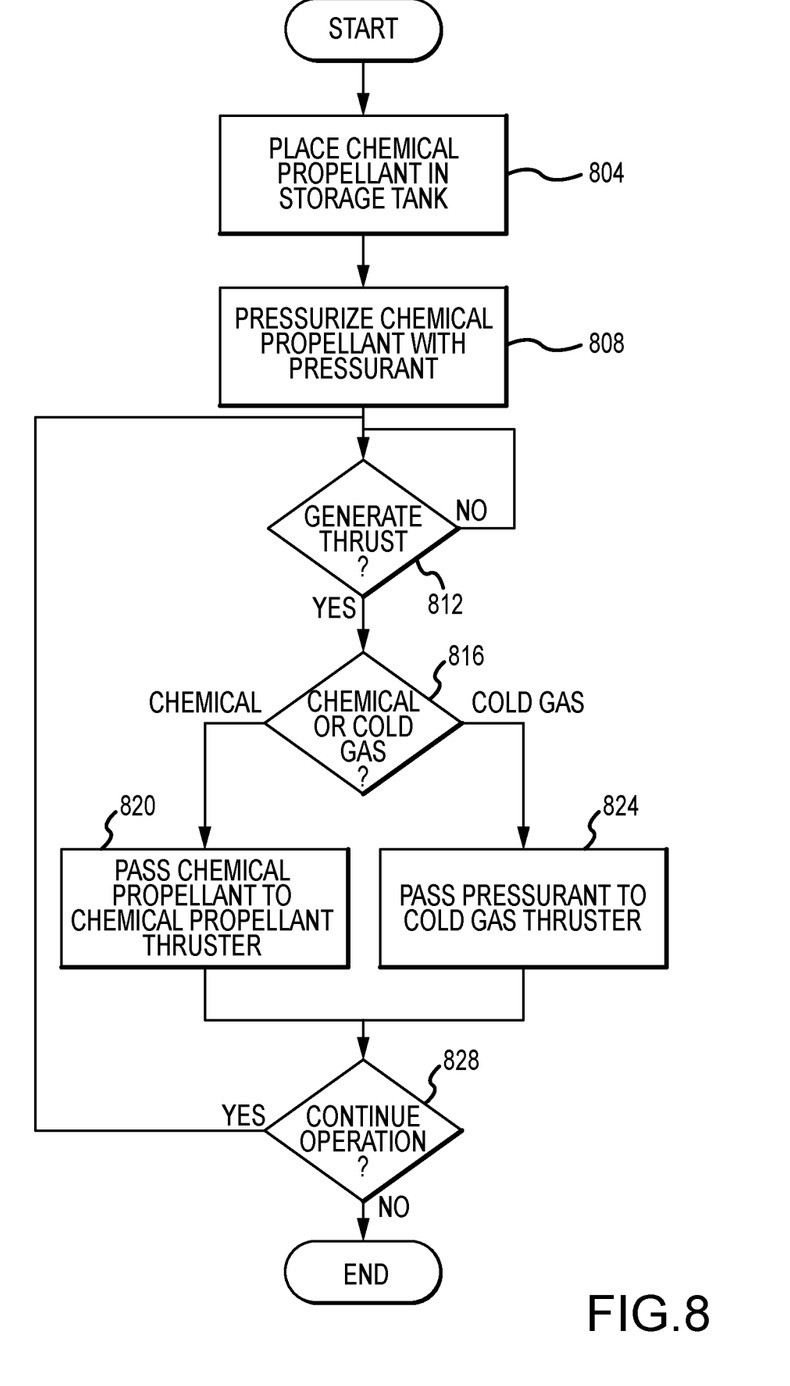
FIG. 8 is a flowchart illustrating aspects of methods for providing and operating an integrated chemical propellant and cold gas thruster system in accordance with embodiments of the present disclosure.

With reference now to FIG. 8, aspects of methods for providing and operating an integrated chemical and cold gas thruster system in accordance with embodiments of the present disclosure are illustrated. Initially, at step 804, a chemical propellant 504 is placed in a storage tank 508. For a bipropellant type chemical thruster system, a first chemical propellant component 504a is placed in a first storage tank 508a, and a second chemical propellant component 504b is placed in a second storage tank 508b. In at least some embodiments of the present disclosure, the chemical component or components 504 are introduced to and stored in the storage tank or tanks 508 as a liquid. The chemical propellant 504 in the storage tank or tanks 508 is then pressurized (step 808). In accordance with embodiments of the present disclosure, pressurizing the chemical propellant 504 can include introducing a pressurant 512, such as an inert gas, into a head space of the storage tank or tanks 508, or into a chamber of the storage tank or tanks 508 that is separated from a chamber containing the chemical propellant 504 by a diaphragm 514. In accordance with still other embodiments of the present disclosure, some amount of the pressurant 512 can be stored in an additional storage or pressurant tank 604. Pressurizing the storage tank or tanks 508 containing a chemical propellant 504 can thus include placing the pressurant 512 in the pressurant tank 604 in communication with the storage tank or tanks 508 containing a chemical propellant 504.

At step 812, a determination can be made as to whether thrust should be generated. If it is determined that thrust should be generated, a determination can next be made as to whether thrust should be generated using a chemical thruster system 528 or 728 or a cold gas thruster system 552 (step 816). In response to a determination that thrust should be generated with a chemical thruster system 528 or 728, a propellant valve 524 can be opened to place a storage tank 508 containing a chemical propellant 504 in communication with a chemical propellant thruster 520 or 714 (step 820). In a monopropellant system, a single propellant valve 524 can be opened to allow a monopropellant chemical 504 to flow from a storage tank 508 to a monopropellant thruster 520. In a bipropellant system, a propellant valve 524a can be opened to allow a first chemical component 508a to flow from the storage tank 508a to a bipropellant thruster 712, and a second propellant valve 524b can be open to allow a second chemical component 508b to flow from a storage tank 508b to the bipropellant thruster 712. If it is determined that thrust should be generated using a cold gas propulsion system, a cold gas valve 544 is opened to release pressurant 512 through a cold gas thruster 536 (step 824).

Depending on the particular configuration of the cold gas thruster system 552, pressurant 512 can be provided to the cold gas thruster 536 from various sources. For example, an integrated chemical and cold gas propellant thruster system 500 can draw pressurant 512 from the head space or separate chamber of the storage tank 504 that also contains a chemical propellant 504 by opening the cold gas valve 544.

As another example, an integrated chemical and cold gas propellant thruster system 600 can draw pressurant 512 solely from the first storage tank 508 containing a chemical propellant 504 by opening the second pressurant valve 608b and the cold gas valve 544 and closing the first pressurant valve 608a; solely from the second or pressurant tank 604 by opening the first pressurant valve 608a and the cold gas valve 544 and closing the second thruster valve 608b; or from both the first 508 and second 604 storage tanks by opening the first 608a and second 608b pressurant valves and the cold gas valve 544.

As yet another example, an integrated chemical and cold gas propellant thruster system 700 can draw pressurant 512 solely from the first storage tank 508a containing a fuel propellant 504a by opening the second pressurant valve 608b and the cold gas valve 544 and closing the first 608a and third 608c pressurant valves; solely from the second storage tank 508b containing an oxidizer propellant 504b by opening the third pressurant valve 608c and the cold gas valve 544 and closing the first 608a and second 608b pressurant valves; solely from the pressurant tank 604 by opening the first pressurant valve 608a and the cold gas valve 544 and closing the second 608b and third 608c pressurant valves; from both the first 508a and second 508b storage tanks by opening the second 608b and third 608c pressurant valves and the cold gas valve 544 and closing the first pressurant valve 608a; from both the first storage tank 508a and the pressurant tank 604 by opening the first pressurant 608a, second pressurant 608b, and cold 544 valves, and closing the third pressurant valve 608c; from both the second storage tank 508b and the pressurant tank 604 by opening the first pressurant 608a, third pressurant 608c, and cold 544 valves, and closing the second pressurant valve 608b; or from the first 508a, second 508b and third 604 storage tanks by opening the first 608a, second 608b, and third 608c pressurant valves and the cold valve 544.

As can be appreciated by one of skill in the art after consideration of the present disclosure, a thruster system 500, 600, 700 in accordance with embodiments of the present disclosure can include a plurality of chemical thrusters or thruster nozzles oriented in various directions and a plurality of cold gas thrusters or thruster nozzles oriented in various directions. Accordingly, the selection of a thruster 520 or 536 can, more particularly, include the selection of a thruster 520 or 536 or associated thruster nozzle oriented in a particular direction, to achieve a particular movement of a platform carrying the thruster system 500, 600, or 700. At step 828, a determination can be made as to whether operation of the system should continue. If operation should continue, the process can return to step 812. Otherwise the process can end.

As can also be appreciated by one of skill in the art after consideration of the present disclosure, the particular type of storage tank 508 used to store a chemical propellant 504 can depend on the characteristics of the chemical to be stored, and the contemplated operating modes of the thruster system 500, 600, or 700. For example, where a chemical propellant 504 that is incompatible with a diaphragm 514 formed from rubber is to be stored, a metal diaphragm 514 or a PMD type storage tank 508 can be used for storing that chemical propellant 504. As another example, where storage capacity is paramount, a PMD type storage tank 508 may be used instead of a storage tank 508 having a diaphragm 514. As yet another example, where a pressurant 512 contained within a storage tank 508 that also contains (or contained) a chemical propellant 504 is to be supplied to a cold gas thruster 536, the storage tank 508 containing that pressurant 512 can include a diaphragm 514 to prevent the release of chemical propellant 504 into the cold gas thruster system 552 and/or the surrounding environment. Alternatively, where a release of chemical propellant 504 is not a concern, or where the operating procedures allow for settling the propellant 504 at the outlet 516, a PMD type storage tank 508 can be used even when the pressurant 512 in that tank 508 will be provided to a cold gas thruster 536. As can also be appreciated by one of skill in the art after consideration of the present disclosure, embodiments of the present disclosure are not limited to any particular number of storage tanks 508 or 604.

Accordingly, embodiments of the present disclosure provide integrated chemical and cold gas propellant systems. More particularly, the systems enable a pressurant to be shared between a chemical propellant thruster system and a cold gas propellant thruster system.

The foregoing description has been presented for purposes of illustration and description. Further, the description is not intended to limit the disclosed systems and methods to the forms disclosed herein. Consequently, variations and modifications commensurate with the above teachings, within the skill or knowledge of the relevant art, are within the scope of the present disclosure. The embodiments described hereinabove are further intended to explain the best mode presently known of practicing the disclosed systems and methods, and to enable others skilled in the art to utilize the disclosed systems and methods in such or in other embodiments and with various modifications required by the particular application or use. It is intended that the appended claims be construed to include alternative embodiments to the extent permitted by the prior art.

What is claimed is:

1. A propulsion system, comprising:
   a first storage tank, the first storage tank containing:
      a chemical propellant; and
      a first volume of a pressurant, wherein the pressurant includes an inert gas;
   a first propellant valve;
   a propellant thruster, wherein the propellant thruster is selectively supplied with chemical propellant from the first storage tank by the first propellant valve;
   a second storage tank; the second storage tank containing a second volume of the pressurant;
   a first pressurant valve;
   a second pressurant valve;
   a cold gas thruster; and
   a conduit,
   wherein the first pressurant valve is between the first volume of the pressurant in the first storage tank and the second pressurant valve,
   wherein the second pressurant valve is between the first pressurant valve and the second volume of the pressurant in the second storage tank,
   wherein the conduit extends from between the first and second pressurant valves to the cold gas thruster,
   wherein the cold gas thruster is selectively supplied with pressurant from the first storage tank by the first pressurant valve and the conduit, and
   wherein the cold gas thruster is selectively supplied with pressurant from the second storage tank by the second pressurant valve and the conduit.

2. The propulsion system of claim 1, further comprising:
   a third storage tank, the third storage tank containing:
      a chemical propellant; and
      a third volume of the pressurant;
   a second propellant valve, wherein the propellant thruster is selectively supplied with chemical propellant from the third storage tank by the second propellant valve; and
   a third pressurant valve, wherein the conduit also extends from between the second and third pressurant valves to the cold Pas thruster and wherein the cold gas thruster is selectively supplied with pressurant from the third storage tank by the third pressurant valve and the conduit.

3. The propulsion system of claim 2, wherein the chemical propellant in the first storage tank is of a first type, and wherein the chemical propellant in the third storage tank is of a second type.

4. The propulsion system of claim 3, wherein the propellant thruster is a bi-propellant thruster.

5. The propulsion system of claim 4, wherein the first storage tank is divided into first and second chambers, wherein the first chamber of the first storage tank contains the chemical propellant of the first type, wherein the second chamber of the first storage tank contains the pressurant, wherein the third storage tank is divided into first and second chambers, wherein the first chamber of the third storage tank contains the chemical propellant of the second type, and wherein the second chamber of the third storage tank contains the pressurant.

6. The propulsion system of claim 1, wherein the propellant thruster is a monopropellant thruster.

7. The propulsion system of claim 1, wherein the first storage tank is divided into first and second chambers, wherein the first chamber contains the chemical propellant, and wherein the second chamber contains the first volume of the pressurant.

8. The propulsion system of claim 1, wherein the pressurant is an inert gas.

9. The propulsion system of claim 8, wherein the inert gas is at least one of gaseous nitrogen and gaseous helium.

10. A spacecraft propulsion method, comprising:
placing a first chemical propellant in a first storage tank;
placing a pressurant in a second storage tank, wherein the pressurant includes an inert gas;
pressurizing the first chemical propellant in the first storage tank with the pressurant, wherein at least some amount of the pressurant is contained within the first storage tank;
providing at least a portion of the first chemical propellant from the first storage tank to a propellant thruster;
combusting the at least a portion of the first chemical propellant in the propellant thruster to produce thrust;
providing at least a portion of the pressurant from the first storage tank to a cold gas thruster via a first conduit by opening a first pressurant valve located between the first storage tank and the first conduit;
providing at least a portion of the pressurant from the second storage tank to the cold gas thruster via the first conduit by opening a second pressurant valve located between the second storage tank and the first conduit; and
releasing the at least a portion of the pressurant provided from at least one of the first and second storage tanks from the cold gas thruster to produce thrust.

11. The method of claim 10, further comprising:
placing a second chemical propellant in a third storage tank;
pressurizing the second chemical propellant in the third storage tank with the pressurant, wherein at least some amount of the pressurant is contained within the third storage tank;
providing at least a portion of the second chemical propellant from the third storage tank to the propellant thruster; and
combining and combusting the at least a portion of the first and second chemical propellants in the propellant thruster to produce thrust.

12. The method of claim 11, further comprising:
providing at least a portion of the pressurant from the third storage tank to the cold gas thruster; and
releasing the at least a portion of the pressurant from the third storage tank from the cold gas thruster to produce thrust.

13. The method of claim 12, wherein
pressurizing at least one of the first and third storage tanks is performed using the pressurant in the second storage tank.

14. The method of claim 10, further comprising:
pressurizing the first storage tank using the pressurant in the second storage tank.

15. The method of claim 10, further comprising:
maintaining a physical separation between the first chemical propellant in the first storage tank and the pressurant in the first storage tank.

16. The method of claim 10, wherein the pressurant is at least one of gaseous nitrogen and gaseous helium.

17. A propulsion system, comprising:
a first storage tank, wherein the first storage tank contains a volume of a first chemical propellant and a first volume of a pressurant, and wherein the pressurant in the first storage tank includes a gas that is other than a vapor phase of the first chemical propellant;
a first propellant valve;
a propellant thruster, wherein the propellant thruster is in selective communication with the volume of the first chemical propellant contained within the first storage tank via the first propellant valve;
a second storage tank, wherein the second storage tank contains a volume of a second chemical propellant and a second volume of the pressurant, wherein the first volume of the pressurant contained in the first storage tank is selectively in communication with the second volume of the pressurant contained in the second storage tank via first and second pressurant valves;
a cold gas valve;
a conduit, wherein the conduit extends from between the first and second pressurant valves to the cold gas valve; and
a cold gas thruster, wherein, in a first operating mode, with the first pressurant valve and the cold as valve open, the cold gas thruster is in communication with the first volume of the pressurant contained within the first storage tank, and wherein, in a second operating mode, with the second pressurant valve and the cold gas valve open, the cold gas thruster is in communication with the second volume of the pressurant contained within the second storage tank.

18. The propulsion system of claim 17, further comprising:
a pressurant tank, wherein the pressurant tank contains a third volume of the pressurant; and
a third pressurant valve, wherein the pressurant tank is in selective communication with the first and second pressurant valves via the third pressurant valve.

19. The propulsion system of claim 18, wherein the cold gas thruster is in selective communication with the pressurant contained within the pressurant tank via the third pressurant valve and the cold gas valve.

20. The propulsion system of claim 19, further comprising:
a second propellant valve, wherein the propellant thruster is a bi-propellant thruster, and wherein the propellant thruster is in selective communication with the volume of the second chemical propellant contained within the second storage tank via the second propellant valve.

21. The propulsion system of claim 17, wherein the first storage tank includes a diaphragm separating the first chemical propellant from the pressurant.

22. The propulsion system of claim 17, wherein the pressurant is at least one of gaseous nitrogen and gaseous helium.

* * * * *

UNITED STATES PATENT AND TRADEMARK OFFICE
CERTIFICATE OF CORRECTION

PATENT NO. : 11,346,306 B1
APPLICATION NO. : 16/733518
DATED : May 31, 2022
INVENTOR(S) : Gordon C. Wu and Suzan Q. Green Page 1 of 1

It is certified that error appears in the above-identified patent and that said Letters Patent is hereby corrected as shown below:

In the Claims

Claim 1, Column 8, Line 14, delete ";" and insert --,-- therefor.

Claim 2, Column 8, Line 44, delete "Pas" and insert --gas-- therefor.

Claim 2, Column 8, Line 44, after the first instance of "thruster" insert --,--.

Claim 17, Column 10, Line 26, delete "as" and insert --gas-- therefor.

Signed and Sealed this
Ninth Day of August, 2022

Katherine Kelly Vidal
*Director of the United States Patent and Trademark Office*